(12) United States Patent
Hanamitsu (10) Patent No.: US 10,924,999 B2
(45) Date of Patent: Feb. 16, 2021

(54) WIRELESS COMMUNICATION DEVICE, CONTROL METHOD, AND STORAGE MEDIUM

(71) Applicant: CANON KABUSHIKI KAISHA, Tokyo (JP)

(72) Inventor: Satoshi Hanamitsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 16/385,984

(22) Filed: Apr. 16, 2019

(65) Prior Publication Data

US 2019/0327681 A1 Oct. 24, 2019

(30) Foreign Application Priority Data

Apr. 24, 2018 (JP) ................................. 2018-083178

(51) Int. Cl.
*H04W 52/02* (2009.01)
*H04W 72/04* (2009.01)
*H04W 88/02* (2009.01)

(52) U.S. Cl.
CPC ... *H04W 52/0235* (2013.01); *H04W 72/0406* (2013.01); *H04W 88/02* (2013.01)

(58) Field of Classification Search
CPC ...................... H04W 52/0235; H04W 72/0406
See application file for complete search history.

(56) References Cited

U.S. PATENT DOCUMENTS

| 2005/0049012 | A1* | 3/2005 | Chang | H04M 1/00 |
| 2010/0277285 | A1 | 11/2010 | Anderson | |
| 2017/0245217 | A1* | 8/2017 | Kim | H04W 52/0264 |
| 2017/0367040 | A1 | 12/2017 | Sakai | |

FOREIGN PATENT DOCUMENTS

JP 2014-225857 A 12/2014

* cited by examiner

*Primary Examiner* — Ronald B Abelson
(74) *Attorney, Agent, or Firm* — Canon U.S.A., Inc. I.P. Division (57) ABSTRACT

A wireless communication device includes a transmission unit configured to transmit a control command, through a wireless communication, to another wireless communication device having a function of shifting itself from a first state in which the wireless communication is possible to a second state in which the wireless communication is not performed, the control command being related to setting of said another wireless communication device, a determination unit configured to determine whether transmission of the control command by the transmission unit is necessary, and a prevention unit configured to prevent shift of said another wireless communication device to the second state if the determination unit determines that transmission of the control command is necessary.

12 Claims, 5 Drawing Sheets

WIRELESS COMMUNICATION DEVICE, CONTROL METHOD, AND STORAGE MEDIUM

BACKGROUND OF THE INVENTION

Field of the Invention

The present invention relates to a wireless communication device, a method, and a storage medium for controlling the wireless communication device.

Description of the Related Art

Conventionally, a wireless communication device using a radio wave conforms to various wireless communication standards. Wireless communication standards include the IEEE 802.11 standard series, which are communication standards for wireless local area network (LAN) and Wi-Fi, and Bluetooth®, which is widely used for headphones, keyboards, and the like. The ZigBee standard and the Z-Wave standard are also included in the wireless communication standards.

Japanese Patent Application Laid-Open No. 2014-225857 discusses a wireless communication system in which devices communicate using a wireless communication standard such as the IEEE 802.11 standard, the Zigbee standard, and the Z-Wave standard.

Since wireless communication devices do not need cables for communication, some of the devices are driven by batteries without a power cable. A battery-driven wireless communication device has a function for reducing power consumption by turning off the power of the communication function portion and by shifting the device to a sleep state when necessary communication is completed or when a wireless communication device serving as a communication partner does not communicate for a certain period. When a wireless communication device serving as a slave unit enters the sleep state, a wireless communication device serving as a master unit cannot cancel the sleep state through communication. When the slave unit detects some condition in a case where the slave unit has a sensor function or at a regular interval time in a case where the slave unit has a timer function, the slave unit cancels the sleep state by itself and communicates with the master unit.

Between wireless communication devices, various settings may be made to a slave unit by a master unit. However, when the slave unit enters a sleep state, in which the slave unit does not communicate with the master unit, while setting is being made from the master unit to the slave unit, the setting cannot be immediately reflected in the slave unit. The setting from the master unit is not reflected until the slave unit cancels the sleep state by itself and delay for the setting occurs.

The present invention is directed to reducing delay time for setting a wireless communication device that includes a function of shifting the wireless communication device itself to a state in which wireless communication is not performed.

SUMMARY OF THE INVENTION

According to an aspect of the present invention, a wireless communication device includes a transmission unit configured to transmit a control command, through a wireless communication, to another wireless communication device having a first state in which the wireless communication is possible and a second state in which the wireless communication is not performed, the control command being related to setting of said another wireless communication device, a determination unit configured to determine whether transmission of the control command by the transmission unit is necessary, and a prevention unit configured to prevent shift of said another wireless communication device to the second state if the determination unit determines that transmission of the control command is necessary.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the accompanying drawings. The exemplary embodiments described below are merely examples of implementation of the present invention, and should be appropriately modified or altered according to the configuration of an apparatus to which the present invention is applied and various conditions. Thus the present invention is not limited to the following exemplary embodiments.

Figure 1:
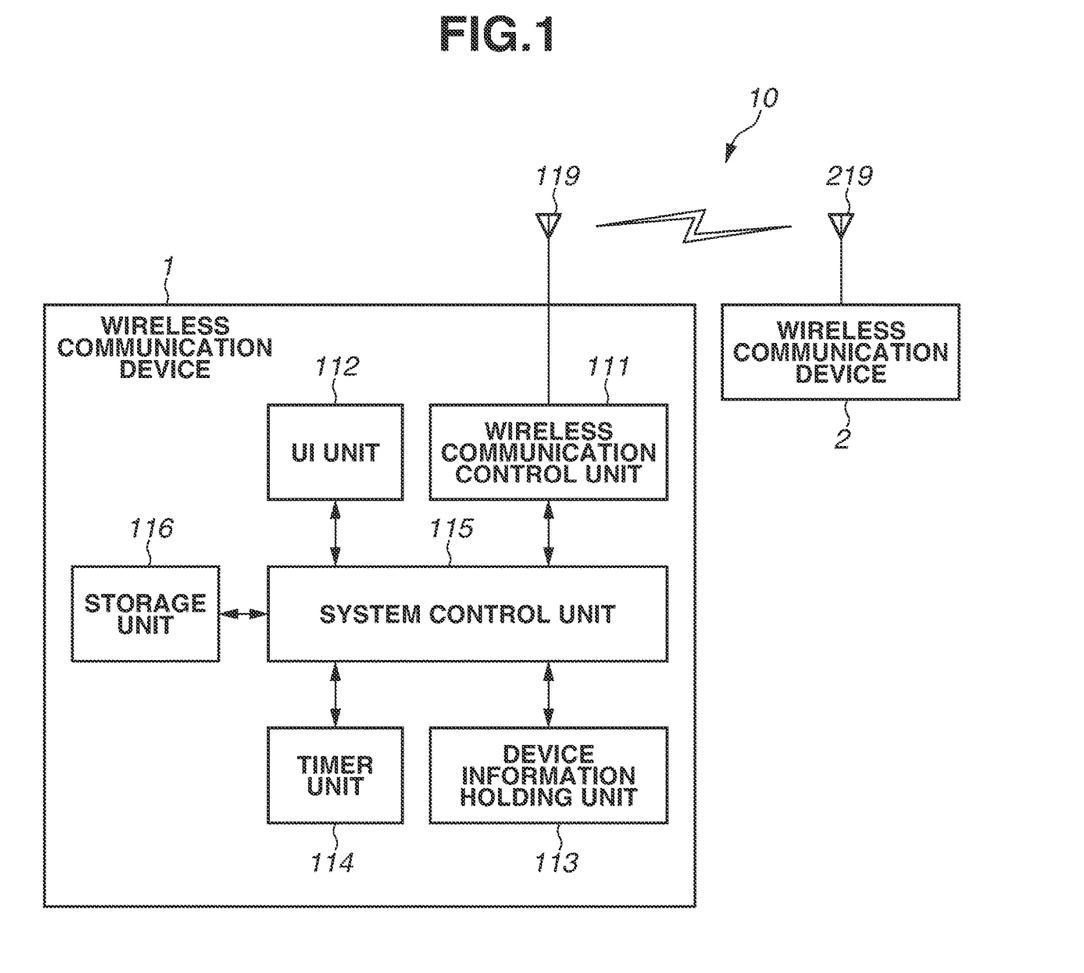
FIG. 1 is a block diagram illustrating a configuration example of a wireless communication system according to an exemplary embodiment.

FIG. 1 is a block diagram illustrating a configuration example of a wireless communication system 10 according to the present exemplary embodiment. In the present exemplary embodiment, a case where the wireless communication system 10 is a wireless local area network (LAN) system conforming, to, for example, the IEEE 802.11 standard series will be described.

In the present exemplary embodiment, the wireless communication system 10 is a system using a wireless LAN for connection between devices, but any other wireless communication standard may be used. The wireless communication system 10 may be a system that performs wireless communication conforming to, for example, the Bluetooth® standard, the Transfer Jet standard, the ZigBee standard, and the Z-wave standard.

The wireless communication system 10 includes a wireless communication device 1 serving as a wireless LAN master unit and a wireless communication device 2 serving as a wireless LAN slave unit. The wireless communication device 1 includes an antenna 119, and the wireless communication device 2 includes an antenna 219. In the following description, the wireless communication device 1 may be also referred to as a "master unit" and the wireless communication device 2 may be also referred to as a "slave unit".

The master unit 1 includes a wireless communication control unit 111, a user interface unit (UI unit) 112, a device information holding unit 113, a timer unit 114, a system control unit 115, a storage unit 116, and the antenna 119. The master unit 1 has a function of managing and controlling the slave unit 2, and makes setting of the slave unit 2 and collects data from the slave unit 2. The master unit 1 is, for example, a network camera, and may include an image capturing unit and the like that are not illustrated in FIG. 1. The network camera as the master unit 1 performs control to start capturing of images or recording of a specific place according to a radio signal received from a sensor device serving as the slave unit 2 described below.

The wireless communication control unit 111 transmits and receives data, commands, and the like to and from the slave unit 2 conforming to the wireless communication standard. The commands include, for example, a control command for setting the slave unit 2 and a control command for requesting a state of the slave unit 2.

The wireless communication control unit 111 demodulates the radio wave received from another wireless communication device (for example, the slave unit 2) through the antenna 119 to acquire a reception signal such as data and a control command. The wireless communication control unit 111 modulates a transmission signal such as data and a control command, and transmits a radio wave to another wireless communication device (for example, the slave unit 2) through the antenna 119.

The UI unit 112 interfaces with a user, receives and displays setting information indicating setting content of the slave unit 2. The unit 112 may include, for example, a button, a keyboard, a pointing device such as a mouse, and a display. If the master unit 1 is a device such as a network camera that does not include a display function, a wired or wireless network function for communicating with an external device such as a personal computer (PC) may be added to the UI unit 112. In this case, the master unit 1 can be configured as a Hypertext Transfer Protocol (HTTP) server that interfaces using a Web browser having an input/output function. The master unit 1 can communicate with an external device such as a PC or a smartphone having a Web browser function via the UI unit 112 through a wired LAN or any wireless communication. The network camera as the master unit 1 may transmit the captured image to the external device via the UI unit 112 so that the user can check the captured image on a display of the external device. Further, the master unit 1 may be configured to receive various settings, which is input to the external device by the user, via the UI unit 112 and reflect the settings as settings made for the network camera serving as the master unit 1.

The device information holding unit 113 holds data acquired by the wireless communication control unit 111 from the slave unit 2 via the antenna 119.

The timer unit 114 measures lapse time.

The system control unit 115 may be configured by one or more central processing units (CPUs). The system control unit 115 comprehensively controls operation of the master unit 1. The system control unit 115 performs information acquisition processing for acquiring data from the slave unit 2, processing for registering the slave unit 2, and processing for setting the slave unit 2 by exchanging data, control commands, and the like with the wireless communication control unit 111. The data, control commands, and the like are exchanged between the slave unit 2 and the wireless communication control unit 111. Details of each processing will be described below.

The storage unit 116 is a memory that stores a control program and the like necessary for the system control unit 115 to perform processing. The storage unit 116 is also used as a work memory and a temporary storage for data when the system control unit 115 executes a program. The storage unit 116 includes a read only memory (ROM) and a random access memory (RAM).

The slave unit 2 is a wireless communication device driven by a battery. The slave unit 2 is, for example, a sensor device having a sensor function such as a human sensor, a temperature sensor, and an illuminance sensor. The slave unit 2 transmits data acquired by the sensor to the master unit 1.

The slave unit 2 performs registration processing to the master unit 1 when a battery is mounted and the slave unit 2 is started. The registration processing is processing for determining connection between devices that perform wireless communication. The registration processing may include information exchange processing (i.e., pairing) for encrypting data as required. This registration processing enables devices that are not physically connected to specify each other and perform wireless communication between the devices.

For example, the Wi-Fi standard provides a function called Wi-Fi Protected Setup (WPS) for registration processing. Registration processing using the WPS function can be started by a master unit and a slave unit when an operation such as pressing a button is performed on both units within a predetermined period. During the registration processing, information such as identifier information of a device that is necessary for communication and key information for encryption are exchanged.

The time point to start the registration processing for registering the slave unit 2 to the master unit 1 is not limited to the time when the slave unit 2 is started upon mounting of a battery. For example, a button may be added to the slave unit 2 and the slave unit 2 may start the registration processing when the button is pressed.

In the present exemplary embodiment, a user instructs the master unit 1 to add the slave unit 2 via the unit 112, and operates the button of the slave unit 2 within a predetermined period of time, and then the registration processing between the master unit 1 and the slave unit 2 starts. In other words, when the master unit 1 receives the adding instruction of the slave unit 2 from the user via the UI unit 112, the master unit 1 performs the registration processing for registering the slave unit 2. When the user operates the button added to the slave unit 2, the slave unit 2 performs the registration processing on the master unit 1.

The slave unit 2 may include only a few buttons for use in the registration processing described above, and thus needs not include a complicated user interface. The management and control of the slave unit 2 are performed entirely by the master unit 1.

As described above, the master unit 1 performs setting processing for the slave unit 2. The setting processing includes setting of, for example, the detection accuracy and the unit (i.e., resolution) of the sensor, and the name for identifying the slave unit 2. The setting processing is performed, for example, after the slave unit 2 is started and the registration processing is performed between the master unit 1 and the slave unit 2.

The slave unit 2 further includes a function for shifting the slave unit 2 itself to a sleep state and a return function for canceling the sleep state of the slave unit 2 itself.

In general, in a battery-driven device, a sleep state, in which power is controlled not to supply power to functions other than some necessary functions, is used to reduce power consumption, thus increasing the operation time. Since the power required for wireless communication depends on the distance over which a radio wave is transmitted, it is difficult to reduce the power consumption for the communication function portion by devising a circuit thereof or the like. Thus, in a battery-driven wireless communication device, power consumption is reduced by turning off the power for the communication function portion and shifting the device to a sleep state when necessary communication is completed or when a communication partner does not communicate for a predetermined period.

In the present exemplary embodiment, the slave unit 2 shifts to a sleep state itself, in which wireless communication is not performed, when communication from the master unit 1 is not performed for a predetermined communication timeout period. When the sleep state continues for a predetermined sleep duration or more, the slave unit 2 cancels the sleep state of the slave unit 2 itself and transmits data acquired by the sensor to the master unit 1. When communication from the master unit 1 is not performed for the communication timeout period after the data transmission, the slave unit 2 shifts itself to the sleep state again and keeps the sleep state for the sleep duration.

The communication timeout period of the slave unit 2 is set to a relatively short period of about 10 seconds to reduce power consumption. The sleep duration of the slave unit 2, which corresponds to a data transmission interval, is set to 1 hour or more by default. The longer the sleep duration is, the less the power consumption becomes. The sleep duration of the slave unit 2 may be changed by a control command from the master unit 1 depending on a type of the sensor and the use of the slave unit 2.

As described above, the slave unit 2 has a sleep state and a sleep-canceled state (i.e., a normal operation state). The slave unit 2 is driven by a battery and shifts the slave unit 2 itself between the normal operation state and the sleep state alternately by using the communication timeout period and the sleep duration.

The slave unit 2 may have various specifications depending on the types of sensor to be combined. For example, in a case where the slave unit 2 includes a sensor for detecting an open/close state of a door, when the slave unit 2 detects opening or closing of the door by the sensor, the slave unit 2 may cancel the sleep state and transmit the detection result of the sensor to the master unit 1. In a case where the slave unit 2 includes a temperature sensor, when the sensor detects that the variation amount of the temperature exceeds a predetermined value, the slave unit 2 may cancel the sleep state and transmit a current temperature to the master unit 1 at a regular time interval.

As described above, the slave unit 2 has a return function for canceling the sleep state of the slave unit 2 itself and for returning to the normal operation state. However, when the slave unit 2 once turns off the power of the communication function portion and enter the sleep state, the sleep state cannot be canceled through communication from an external device such as the master unit 1. When any state is detected by the sensor function of the slave unit 2, or at a regular time interval (i.e., every sleep duration) by using a timer function, the slave unit 2 cancels the sleep state of the slave unit 2 itself and resumes communication with the master unit 1.

For example, when the communication timeout period (i.e., 10 seconds) elapses while a user is performing the setting processing for the slave unit 2 via the master unit 1 and the slave unit 2 enters the sleep state, the master unit 1 cannot transmit a control command for the setting of the slave unit 2. The command is transmitted after the slave unit 2 cancels the sleep state of the slave unit 2 itself, and the setting content is then reflected to the slave unit 2. Thus, the setting is delayed.

In the present exemplary embodiment, the master unit 1 determines whether it is necessary to perform the setting processing for the slave unit 2 having the function of shifting the slave unit 2 itself to the sleep state. If the master unit 1 determines that the setting processing is necessary, the master unit 1 prevents the slave unit 2 from shifting itself to the sleep state. The case where it is necessary to perform the setting processing is a case where a control command related to the setting of the slave unit 2 needs to be transmitted to the slave unit 2, and includes a case where, for example, the transmission of the control command is scheduled by a user.

In the present exemplary embodiment, the master unit 1 prevents the shift of the slave unit 2 to the sleep state by adjusting the sleep duration of the slave unit 2 when it is necessary to perform the setting processing for the slave unit 2 (hereinafter referred to as "during setting operation"). Specifically, the master unit 1 sets the sleep duration during the setting operation shorter than the sleep duration when the setting processing for the slave unit 2 is unnecessary (hereinafter referred to as "during a non-setting operation"). Thus, the master unit 1 prevents the slave unit 2 from staying in the sleep state for a long period.

In FIG. 1, the wireless communication system 10 includes only one slave unit 2, but the number of slave units 2 may be two or more. In this case, the wireless communication system 10 is a system in which the master unit 1 comprehensively controls a large number of slave units 2 and collects data from a sensor included in each of the slave units 2.

Hereinafter, the operation of the master unit 1 in performing the registration processing and the setting processing for the slave unit 2 will be described.

Figure 2:
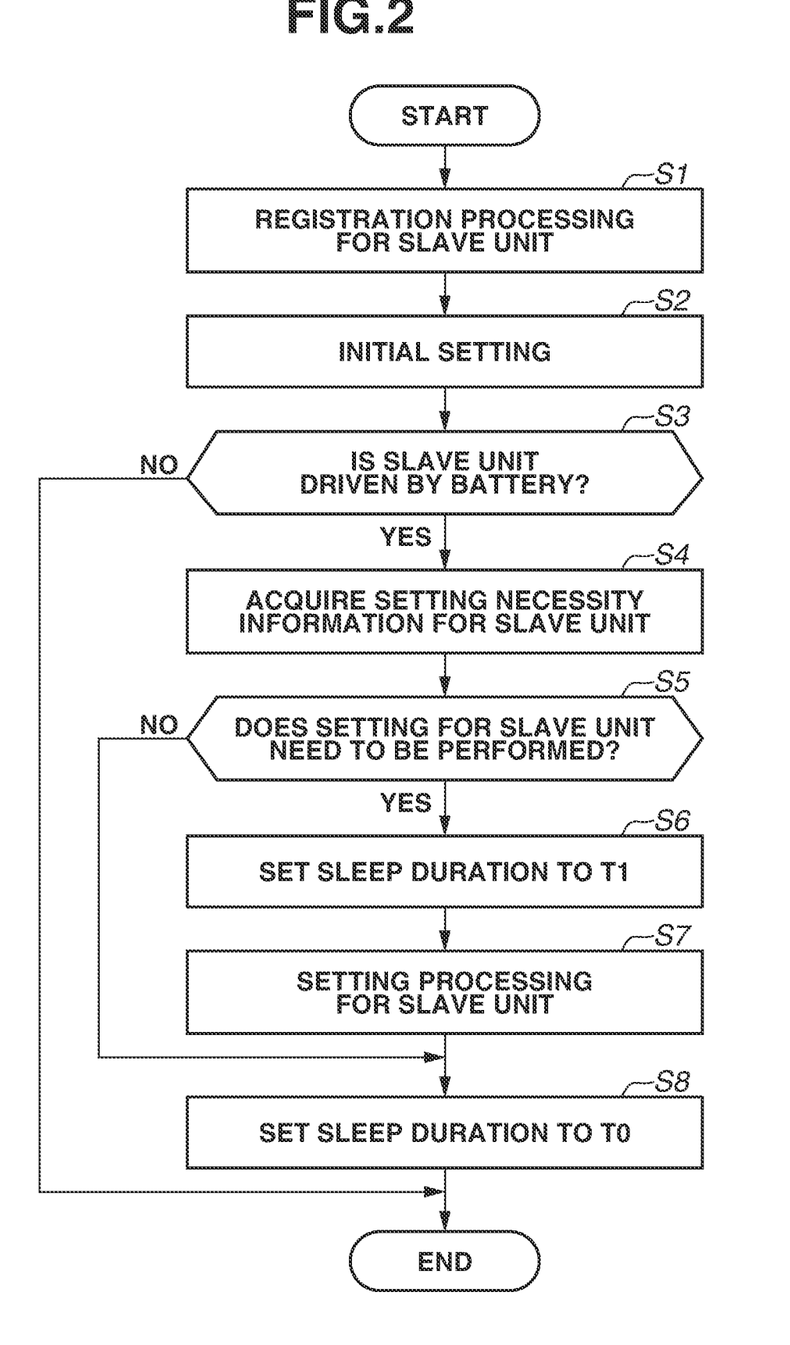
FIG. 2 is a flowchart illustrating a procedure of registration and setting processing according to a first exemplary embodiment.

FIG. 2 is a flowchart illustrating the procedure of the registration and setting processing performed by the system control unit 115 of the master unit 1. The processing illustrated in FIG. 2 starts, for example, at the time point when the system control unit 115 receives an instruction for adding the slave unit 2 from a user via the UI unit 112. However, the start time point of the processing illustrated in FIG. 2 is not limited to the above-mentioned time point. The system control unit 115 can perform the processing illustrated in FIG. 2 by loading and executing a necessary program from the storage unit 116. Hereinafter, the label S denotes a step in the flowchart.

In step S1, the system control unit 115 performs registration processing for the slave unit 2. Specifically, the system control unit 115 exchanges information with the slave unit 2 through the wireless communication control unit 111, and performs processing such as setting an identifier for the slave unit 2.

In step S2, the system control unit 115 performs initial setting of the slave unit 2. Specifically, the system control unit 115 acquires information about the slave unit 2 through the wireless communication control unit 111, and stores the acquired information into the device information holding unit 113. The information about the slave unit 2 includes information about, for example, whether the slave unit 2 is battery powered. The system control unit 115 exchanges information for encrypting communication with the slave unit 2 with the slave unit 2 through the wireless communication control unit 111.

In step S3, the system control unit 115 determines whether the slave unit 2 is battery driven based on the information about the slave unit 2 acquired in step S2. If the system control unit 115 determines that the slave unit 2 is battery driven (Yes in step S3), the processing proceeds to step S4. If the system control unit 115 determines that the slave unit 2 is not battery driven (No in step S3), the processing ends without any other operation.

In step S4, the system control unit 115 acquires setting necessity information indicating the necessity of the setting processing for the slave unit 2. For example, the setting necessity information is acquired from the user through the UI unit 112. In this case, the system control unit 115 may display a dialog or the like on the UI unit 112 before or after the registration and setting processing starts to prompt the user to input the setting necessity information.

In step S1, the system control unit 115 determines whether the setting processing for the slave unit 2 needs to be performed based on the setting necessity information acquired in step S4. If the system control unit 115 determines that the setting processing needs to be performed (Yes in step S5), the processing proceeds to step S6. On the other hand, if the system control unit 115 determines that the setting processing for the slave unit 2 is not needed (No in step S5), the processing proceeds to step S8.

In step S6, the system control unit 115 causes the slave unit 2 to set the sleep duration to a sleep duration T1 during the setting operation, which is shorter than a sleep duration T0 during the non-setting operation. Specifically, the system control unit 115 transmits a control command to the slave unit 2 through the wireless communication control unit 111 to instruct the slave unit 2 to set the sleep duration to the sleep duration T1 during the setting operation.

Here, the sleep duration T1 is set based on a delay time which is assumed to be acceptable after the user instructs the setting for the slave unit 2 until the user can confirm that the setting has been correctly performed. For example, the sleep duration T1 may be 1 second. If the sleep duration of the slave unit 2 is set to 1 second, even if the slave unit 2 shifts the slave unit 2 itself to the sleep state, the sleep state is canceled in 1 second. In other words, if the sleep duration of the slave unit 2 is set to 1 second, the delay time for displaying or transmitting/receiving data when the user performs setting of the slave unit 2 and confirms the state of the slave unit 2 is about 1 second. Thus, the user can perform setting of the slave unit 2 and confirm the state of the slave unit 2 quickly enough. The period set as the sleep duration T1 is not limited to 1 second as long as the sleep duration T1 is shorter than the sleep duration T0. The minimum period that can be set to the slave unit 2 may be set as the sleep duration T1. In a case where 0 seconds can be set as the sleep duration, 0 seconds may be set as the sleep duration T1 to substantially prevent the slave unit 2 from shifting the slave unit 2 to the sleep state.

In step S7, the system control unit 115 performs setting processing for the slave unit 2. Specifically, the system control unit 115 receives setting information indicating the setting content of the slave unit 2 made by the user through the UI unit 112. The system control unit 115 then transmits a control command based on the received setting information to the slave unit 2 through the wireless communication control unit 111.

When the system control unit 115 receives information instructing end of the setting processing from a user through the UI unit 112, the system control unit 115 determines that the setting processing is completed and the processing proceeds to step S8. In addition, the system control unit 115 uses the timer unit 114 to measure the lapse time from the last receipt of the setting information from a user and determines that the setting processing is completed also when the measured lapse time reaches the setting change timeout period, and the processing proceeds to step S8. The setting change timeout period may be, for example, 10 minutes. By setting the setting change timeout period in this way, it is possible to avoid the processing from being stopped even if a user does not explicitly instruct the completion of the setting processing.

In step S8, the system control unit 115 sets the sleep duration T0 during the non-setting operation for the slave unit 2. Specifically, the system control unit 115 transmits a control command to the slave unit 2 through the wireless communication control unit 111 to instruct the slave unit 2 to set the sleep duration to the sleep duration T1 during the non-setting operation. The sleep duration T0 may be set to a period of 1 hour to 2 hours. The sleep duration T0 is appropriately set according to the type of the slave unit 2. The longer the sleep duration T0 is set, the more the power consumption of the slave unit 2 is reduced.

As described above, when the system control unit 115 determines that the setting processing for the slave unit 2 is completed, the system control unit 115 cancels the prevention of the shift of the slave unit 2 to the sleep state.

Figure 3:
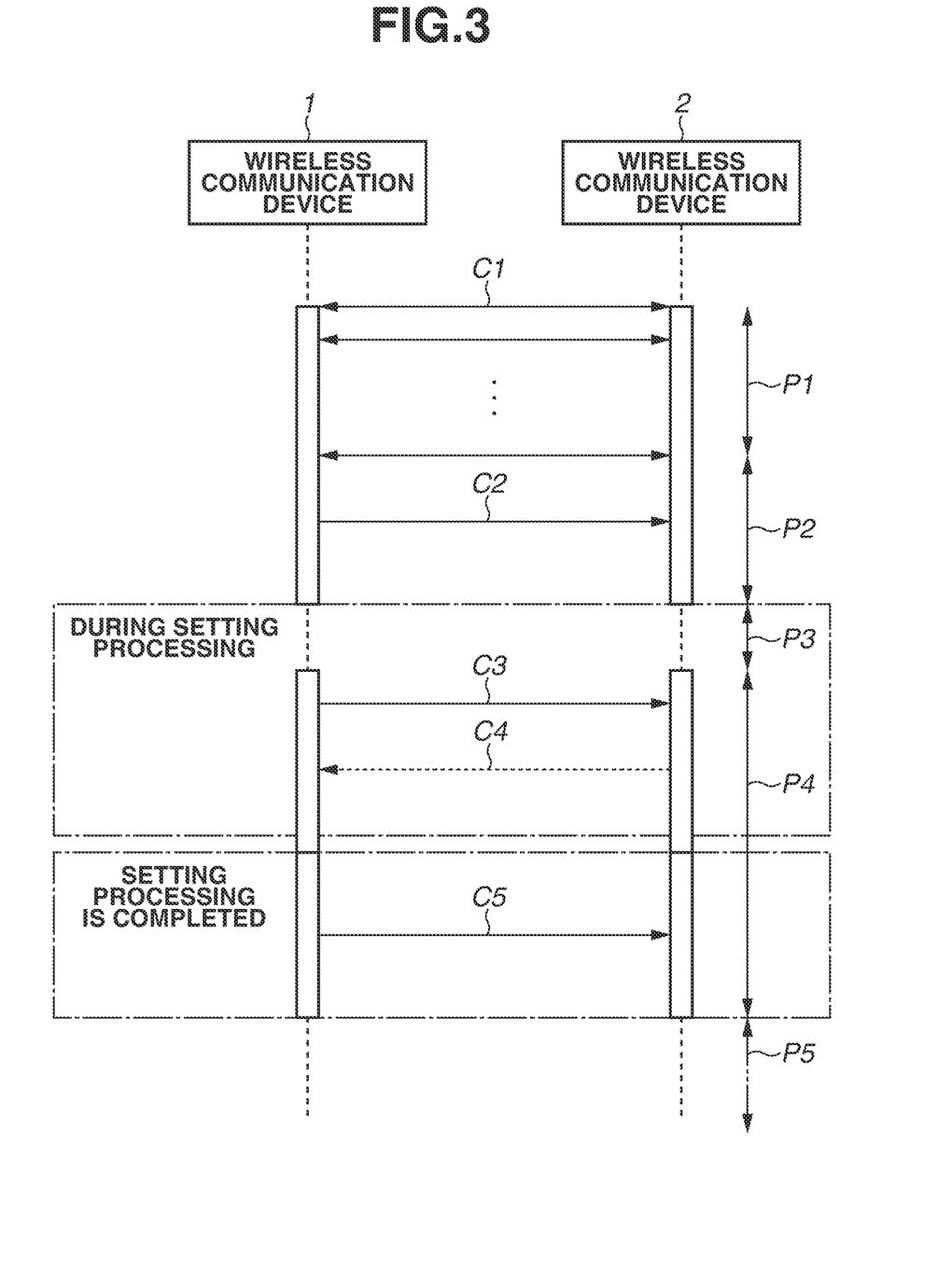
FIG. 3 is a sequence diagram illustrating a communication sequence between wireless communication devices according to the first exemplary embodiment.

FIG. 3 is a sequence diagram illustrating a communication sequence in registration processing and setting processing between the wireless communication device (i.e., the master unit) 1 and the wireless communication device (i.e., the slave unit) 2. The communication sequence, which is illustrated in FIG. 3, starts when the user operates the slave unit 2 within a predetermined period after the user instructs the master unit 1 to add the slave unit 2.

During a period P1, the master unit 1 and the slave unit 2 exchange information with each other by communication processing C1 according to the wireless communication standard, and perform registration processing and initial setting performed in step S1 and step S2 of FIG. 2. The master unit 1 acquires setting necessity information indicating the necessity of the setting processing of the slave unit 2 from the user as default setting during or before the period P1. A case where a user provides the master unit 1 setting necessity information indicating that setting processing for the slave unit 2 is to be performed will be described.

A period P2 is a period during which the slave unit 2 can receive communication after the initial setting of the slave unit 2. During the period P2, the master unit 1 performs the communication processing C2 and transmits a control command to the slave unit 2 to instruct the slave unit 2 to set the sleep duration to the sleep duration T1 during the setting operation. Upon reception of the control command from the master unit 1, the slave unit 2 sets the sleep duration to the sleep duration T1 during the setting operation. Thus, the sleep duration of the slave unit 2 is set to, for example, 1 second, which is shorter than the sleep duration T0 during the non-setting operation.

Thereafter, when the slave unit 2 does not receive communication from the master unit 1 for the communication timeout period (e.g., 10 seconds), the slave unit 2 shifts itself to the sleep state. At this time, the sleep duration of the slave unit 2 is set to the sleep duration T1 during the setting operation. Thus, the slave unit 2 maintains the sleep state for the sleep duration T1.

A period P3 is the sleep duration T1 during the setting operation of the slave unit 2, which is a period of, for example, 1 second. Since the power supply to the communication function portion is cut off during this period P3, the slave unit 2 cannot receive communication from the master unit 1.

When the sleep duration T1 elapses after the slave unit 2 shifts itself to the sleep state, the slave unit 2 cancels the sleep state and returns to the normal operation state, in which the power supply is not restricted.

A period P4 is a period during which wireless communication for setting processing is performed between the master unit 1 and the slave unit 2. The master unit 1 transmits a control command related to the setting to the slave unit 2 by means of communication processing C3, and receives a response from the slave unit 2 by communication processing C4. Specifically, based on the setting information received from the user, the master unit 1 transmits a control command for instructing the slave unit 2 to change the current setting of the slave unit 2. Further, the master unit 1 transmits a control command for requesting the state of the current setting of the slave unit 2 to the slave unit 2, and acquires information indicating the state of the current setting of the slave unit 2 as a response to the control command. At this time, the master unit 1 may display the state of the current setting of the slave unit 2 received from the slave unit 2 on the UI unit 112. The displaying enables the user to confirm whether the instruction of setting change to the slave unit 2 has been reflected.

During period P4, when a period within which no communication is performed from the master unit 1 to the slave unit 2 reaches the communication timeout period, the slave unit 2 shifts itself from the normal operation state to the sleep state. In other words, the communication sequence enters the period P3. The period P3 and the period P4 are repeated until the setting processing for the slave unit 2 is completed.

Within the period P4, when the master unit 1 receives information indicating the end of the setting processing from the user, or the setting change timeout period has passed before the master unit 1 receives the setting information from the user, the master unit 1 determines that the setting processing for the slave unit 2 is completed. The master unit 1 then transmits a control command, by means of communication processing C5, to the slave unit 2 to instruct the slave unit 2 to set the sleep duration to the sleep duration T0 during the non-setting operation. Upon reception of the control command from the master unit 1, the slave unit 2 sets the sleep duration to the sleep duration T0 during the non-setting operation. Thus, the sleep duration of the slave unit 2 is set to, for example, one hour or more in order to reduce the power consumption.

When a period within which no communication is performed from the master unit 1 to the slave unit 2 reaches the communication timeout period, the slave unit 2 shifts itself from the normal operation state to the sleep state. At this time, the sleep duration of the slave unit 2 is set to the sleep duration T0 during the non-setting operation. Thus, the slave unit 2 keeps the sleep state for the sleep duration T0 unless any state is detected by the sensor or the sleep state is forcibly canceled by an external device. A period P5 is the sleep duration T0 during the non-setting operation of the slave unit 2.

As described above, the wireless communication device (i.e., the slave unit) 2 according to the present exemplary embodiment includes a function for shifting itself from the normal operating state, in which wireless communication is possible, to the sleep state, in which wireless communication is not performed. In addition, the wireless communication device (i.e., the master unit) 1 performs the setting processing for the slave unit 2 by transmitting a control command related to the setting of the slave unit 2 to the slave unit 2 through wireless communication. The master unit 1 determines whether a control command related to the setting of the slave unit 2 needs to be transmitted, in other words, whether the setting processing for the slave unit 2 needs to be performed. If the master unit 1 determines that the setting processing needs to be performed, the master unit 1 prevents the shift of the slave unit 2 to the sleep state.

Thus, it is possible to prevent the slave unit 2 from shifting itself to the state in which the slave unit 2 does not perform wireless communication, reducing the delay of the control command that should be transmitted from the master unit 1 to the slave unit 2. Accordingly, it is possible to reduce the delay in setting to the slave unit 2 having a function of shifting the slave unit 2 itself to a state in which wireless communication is not performed.

In preventing the shift of the slave unit 2 to the sleep state, the master unit 1 may prevent the shift to the sleep state by instructing the slave unit 2 to change the setting of the shifting function to the sleep state. Specifically, when the slave unit 2 shifts from the normal operation state to the sleep state, the slave unit 2 has a return function of returning from the sleep state to the normal operation state after staying in the sleep state for a predetermined period. Thus, the master unit 1 prevents the shift of the slave unit 2 to the sleep state by causing the slave unit 2 to set the sleep duration to the sleep duration T1 in the setting operation, which is shorter than the sleep duration T0 during the non-setting operation.

As a result, even if the slave unit 2 shifts itself to the sleep state, the slave unit 2 can quickly return to the normal operation state during the setting processing for the slave unit 2. As described above, the master unit 1 can set the sleep duration T1 shorter than the sleep duration T0 during the non-setting operation to the slave unit 2 during the setting processing for the slave unit 2. Therefore, the delay time related to the setting processing for the slave unit 2 is reduced, and convenience of the user is improved.

Further, in the setting processing for the slave unit 2, the master unit 1 receives setting information indicating setting content of the slave unit 2 from the user and transmits a control command based on the setting information to the slave unit 2. Thus, the user can appropriately set the slave unit 2, through the master unit 1, that does not include a complicated user interface.

Further, the master unit 1 acquires setting necessity information indicating the necessity of the setting processing for the slave unit 2 from the user before or after start of the registration and setting processing. Thus, the master unit 1 can appropriately determine the necessity of transmission of a control command related to the setting of the slave unit 2, and can appropriately prevent the slave unit 2 from staying in the sleep state for a lone time.

Further, the master unit 1 determines whether the setting processing for the slave unit 2 is completed, and when the master unit 1 determines that the setting processing is completed, the master unit 1 cancels the prevention of the shift of the slave unit 2 to the sleep state. Specifically, the master unit 1 cancels the prevention of the shift of the slave unit 2 to the sleep state by setting the sleep duration T0 during the non-setting operation of the slave unit 2. The sleep duration T0 can be set to a long time of 1 hour or more. Therefore, by canceling the prevention of the shift to the sleep state, the power consumption of the slave unit 2 is appropriately reduced.

Further, the master unit 1 determines that the setting processing is completed when an instruction to end the setting processing is input from the user. Thus, the master unit 1 can cancel the prevention of the shift to the sleep state at an appropriate time point. The master unit 1 can also determine that the setting processing is completed when a period within which the master unit does not receive the setting information of the slave unit 2 from the user reaches a predetermined period (i.e., the setting change timeout period). By setting the setting change timeout period, it is possible to appropriately cancel the prevention of the shift to the sleep state even if the user does not explicitly instruct the end of the setting processing.

As described above, the wireless communication device (i.e., the master unit) 1 according to the present exemplary embodiment can reduce the delay of setting for wireless communication while suppressing the increase in power consumption of the battery-driven wireless communication device (i.e., the slave unit) 2 using the sleep state.

In the present exemplary embodiment, a case where the master unit 1 transmits a control command to the slave unit 2 to instruct the slave unit 2 to set the sleep duration to the sleep duration T1 during the setting operation for preventing the shift of the slave unit 2 to the sleep state has been described. However, the master unit 1 may transmit, to the slave unit 2, information indicating that transmission of a control command related to the setting will be performed. In this case, the slave unit 2 receives the information transmitted by the master unit 1 and sets the sleep duration to the sleep duration T1 during the setting operation. In this case, a similar effect to that of the above-described exemplary embodiment can be obtained.

In the present exemplary embodiment, the shift of the slave unit 2 to the sleep state is prevented by transmitting a control command for instructing the slave unit 2 to change the sleep duration as a control command for instructing the slave unit 2 to change the setting of the shift function to the sleep state. However, the control command for instructing the setting change of the shifting function is not limited to the above-described command. For example, a control command for instructing the slave unit 2 to set the communication timeout period longer than that during the non-setting operation may be transmitted to prevent the shift of the slave unit 2 to the sleep state.

Next, a second exemplary embodiment of the present invention will be described.

In the first exemplary embodiment described above, a case where the shift of the slave unit 2 to the sleep state is prevented by adjusting the sleep duration. In a second exemplary embodiment, a case where a master unit 1 transmits a control command to a slave unit 2 at a predetermined period to prevent the shift of the slave unit 2 to the sleep state will be described.

The configurations of a wireless communication system 10, the master unit 1, and the slave unit 2 according to the present exemplary embodiment are similar to those as illustrated in FIG. 1. However, registration and setting processing performed by a system control unit 115 of the master unit 1 is different from that of the first exemplary embodiment described above.

Figure 4:
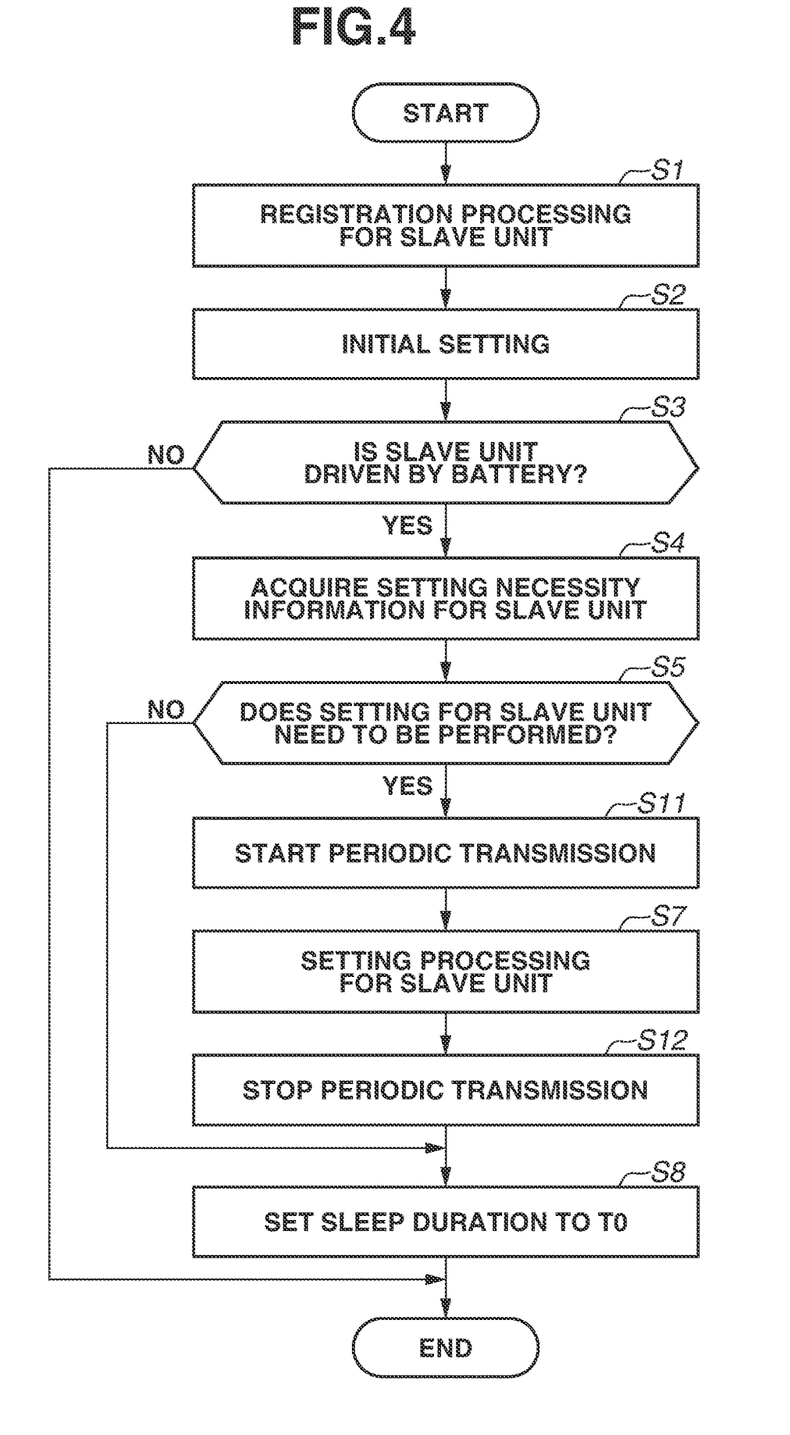
FIG. 4 is a flowchart illustrating a procedure of registration and setting processing according to a second exemplary embodiment.

FIG. 4 is a flowchart illustrating the procedure of the registration and setting processing performed by the system control unit 115 according to the present exemplary embodiment. In FIG. 4, the same step numbers as those in FIG. 2 are given to the steps for performing the same processing as described in FIG. 2. Steps for performing processing different from the processing in FIG. 2 will be mainly described below.

When the system control unit 115 determines in step S5 that the setting processing for the slave unit 2 needs to be performed (Yes in step S5), the processing proceeds to step S11 and the system control unit 115 starts periodic transmission to the slave unit 2. The periodic transmission is processing for consecutively transmitting predetermined commands to the slave unit 2 at a predetermined period. The predetermined period of the periodic transmission is set shorter than a communication timeout period of the slave unit 2. For example, if the communication timeout period is 10 seconds, the period of the periodic transmission is set to 9 seconds.

The predetermined command transmitted in the periodic transmission is a command that does not change the setting of the slave unit 2. The commands that does not change the setting of the slave unit 2 includes a control command for acquiring the state of the slave unit 2 and a No OPeration (NOP) command that does not perform any processing.

When the system control unit 115 determines in step S7 that the setting processing for the slave unit 2 is completed, the processing proceeds to step S12 and the system control unit 115 stops the periodic transmission to the slave unit 2. The processing then proceeds to step S8.

Figure 5:
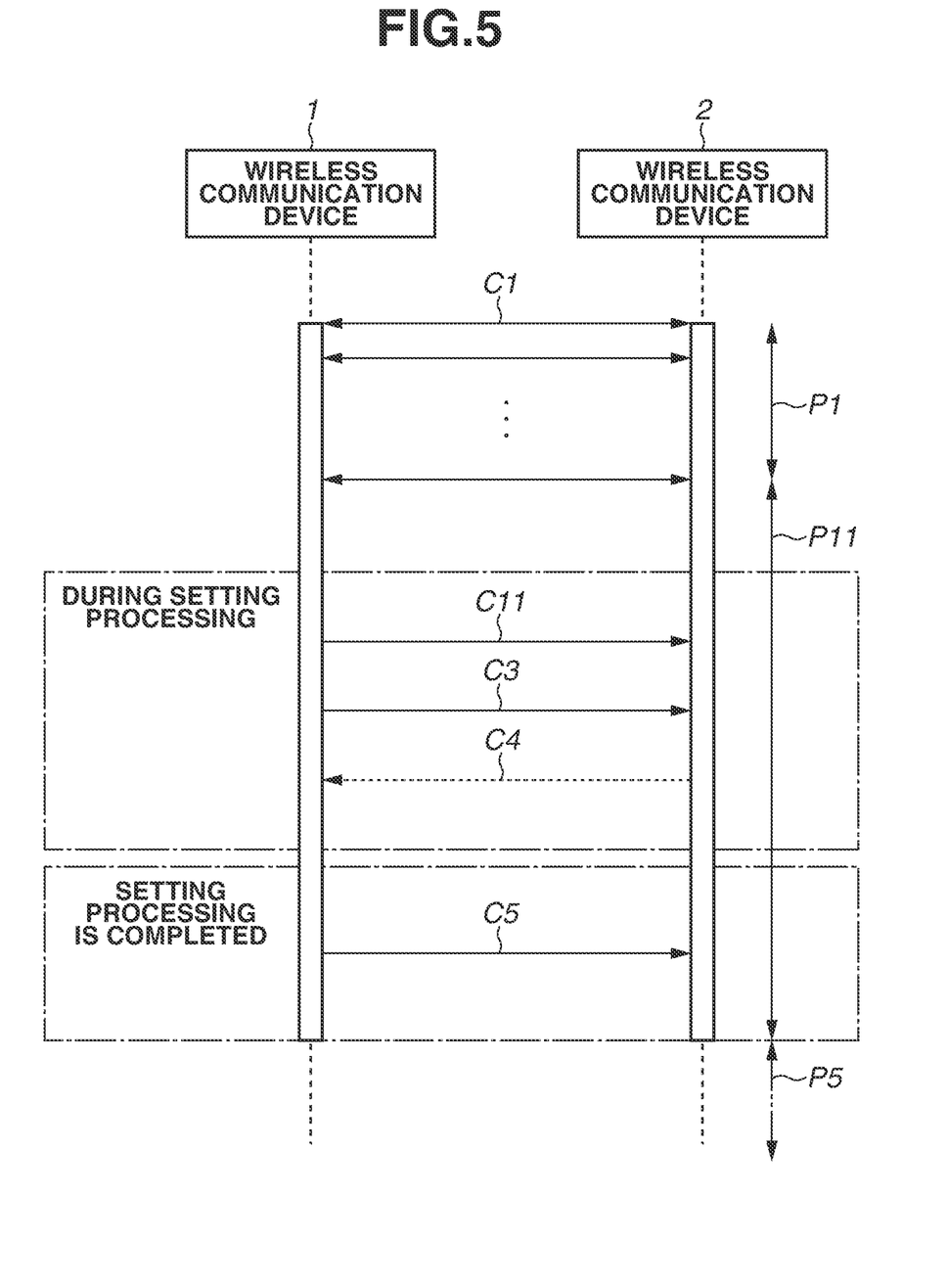
FIG. 5 is a sequence diagram illustrating a communication sequence between wireless communication devices according to the second exemplary embodiment.

FIG. 5 is a sequence diagram illustrating a communication sequence in registration processing and setting processing between the master unit 1 and the slave unit 2. Similarly to the first exemplary embodiment described above, the communication sequence, which is illustrated in FIG. 5, starts when a user operates the slave unit 2 within a predetermined period after the user instructs the master unit 1 to add the slave unit 2.

A period P1 and communication processing C1 are the same as the period P1 and the communication processing C1 illustrated in FIG. 3.

A period P11 represents a period during which the slave unit 2 can receive communication after the initial setting of the slave unit 2. If the slave unit 2 does not receive communication from the master unit 1 within the period P11, the slave unit 2 shifts itself from the normal operation state to the sleep state.

During the period P11, the master unit 1 performs the communication processing C11 and transmits, to the slave unit 2, a command that does not change the setting of the slave unit 2. During the period P11, the master unit 1 starts wireless communication for setting processing between the master unit 1 and the slave unit 2 by means of the communication processing C3 and C4 in the same manner as the first exemplary embodiment. The master unit 1 consecutively repeats the communication processing C11 at an interval shorter than the communication timeout period during the period P11. Thus, the slave unit 2 does not shift itself to the sleep state and keeps a state in which wireless communication with the master unit 1 is possible.

The master unit 1 consecutively repeats the communication processing C11 at an interval shorter than the communication timeout period until the master unit 1 determines that the setting processing for the slave unit 2 is completed. When the master unit 1 determines that the setting processing for the slave unit 2 is completed, the master unit 1 stops the communication processing C11. The master unit 1 further transmits a control command to the slave unit 2 to instruct the slave unit 2 to set the sleep duration to the sleep duration T0 during the non-setting operation by means of communication processing C5. The communication processing C5 is the same as the communication processing C5 illustrated in FIG. 3.

Thereafter, when a period within which no communication is performed from the master unit 1 to the slave unit 2 reaches the communication timeout period, the slave unit 2 shifts itself from the normal operation state to the sleep state during a period P5. The period P5 is the same as the period P5 illustrated in FIG. 3.

As described above, the wireless communication device (i.e., the master unit) 1 in the present exemplary embodiment consecutively transmits predetermined commands to the wireless communication device (i.e., the slave unit) 2 at a period shorter than the communication timeout period, thereby preventing the shift of the slave unit 2 to the sleep state. By thus transmitting the command at a period shorter than the communication timeout period used as the condition of shifting the slave unit 2 from the normal operation state to the sleep state, it is possible to prevent the slave unit 2 from shifting itself to the sleep state. The master unit 1 can prevent the slave unit 2 from shifting itself to a state in which the slave unit 2 does not perform wireless communication by performing the above-described periodic transmission to the slave unit 2 during the setting processing for the slave unit 2. Therefore, the delay time related to the setting processing for the slave unit 2 can be reduced more appropriately, and convenience of a user can be improved.

Further, in the periodic transmission, the master unit 1 can transmit a control command for acquiring the state of the slave unit 2, an NOP command not to perform any processing, and the like. Therefore, the shift of the slave unit 2 to the sleep state can be appropriately prevented without changing the setting of the slave unit 2.

In each of the above exemplary embodiments, the master unit 1 may change the method for preventing the shift of the slave unit 2 to the sleep state depending on the range of the sleep duration that is set in the slave unit 2. For example, in a case where the sleep duration T1 during the setting operation is within a range of the sleep duration that can be set in the slave unit 2, the master unit 1 may prevent the shift of the slave unit 2 to the sleep state by adjusting the sleep duration as described in the first exemplary embodiment. On the other hand, in a case where the sleep duration T1 during the setting operation is out of the range of the sleep duration that can be set in the slave unit 2, the master unit 1 may prevent the shift of the slave unit 2 to the sleep state, by performing the periodic transmission as described in the second exemplary embodiment.

For example, if the shortest period of the sleep duration that can be set in the slave unit 2 is 1 minute and a desired sleep duration T1 is 1 second, the sleep duration T1 becomes out of the sleep duration range that can be set. Thus, in this case, the master unit 1 prevents the shift of the slave unit 2 to the sleep state by performing the periodic transmission. By thus giving priority to the method of adjusting the sleep duration, it is possible to reduce the number of commands necessary to be transmitted from the master unit 1 to the slave unit 2 to prevent the shift of the slave unit 2 to the sleep state.

In each of the above exemplary embodiments, although the setting processing is performed after the registration processing for the slave unit 2, the time point of the setting processing is not limited to the time point described above. For example, the setting processing can be performed during normal operation of the slave unit 2. Also in this case, it is possible to prevent the slave unit 2 from keeping the sleep state for a long time during the setting operation by the user by adjusting the sleep duration or starting the periodic transmission.

In a case where a user starts the setting processing during the normal operation, when the slave unit 2 is in the sleep state, a user directly operates the slave unit 2 to cancel the sleep state once, and then the user operates the master unit 1 to change the setting. By preventing the slave unit 2 from entering the sleep state when the user changes the setting, a situation can be prevented where the slave unit 2 enters the sleep state during the setting change by the user and the user operates the slave unit 2 again to cancel the sleep state. Thus, convenience of a user is improved.

Further, in each of the above exemplary embodiments, in a case where the slave unit 2 has the shifting function from the normal operation state to the sleep state, the master unit 1 determines whether the setting processing for the slave unit 2 is necessary. If the master unit 1 determines that the setting processing is necessary, the master unit 1 prevents the shift to the sleep state. However, the shifting function of the slave unit 2 is not limited to the function described above. The slave unit 2 needs only a shifting function from a first state in which wireless communication is possible to a second state in which wireless communication is not performed, and the second state described above is not limited to the sleep state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD) or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-083178, filed Apr. 24, 2018, which is hereby incorporated by reference herein in its entirety.

What is claimed is:

1. A wireless communication device comprising:
    a transmission unit configured to transmit a control command, through a wireless communication, to another wireless communication device having a first state in which the wireless communication is possible and a second state in which the wireless communication is not performed, the control command being related to setting of said another wireless communication device;

a first determination unit configured to determine whether transmission of the control command by the transmission unit is necessary; and a prevention unit configured to prevent shift of said another wireless communication device to the second state if the first determination unit determines that transmission of the control command is necessary; and a second determination unit configured to determine whether the transmission of the control command by the transmission unit is completed; and a canceling unit configured to cancel the prevention by the prevention unit if the second determination unit determines that the transmission of the control command is completed.

2. The wireless communication device according to claim 1, wherein the prevention unit prevents the shift to the second state by instructing said another wireless communication device to change setting related to the shift.

3. The wireless communication device according to claim 1, wherein said another wireless communication device further includes a function of returning from the second state to the first state after keeping the second state for a predetermined period when said another wireless communication device is shifted from the first state to the second state, and wherein the prevention unit prevents the shift to the second state by instructing said another wireless communication device to set the predetermined period to a second period that is shorter than a first period that is set when transmission of the control command is not necessary.

4. The wireless communication device according to claim 1, wherein said another wireless communication device is shifted from the first state to the second state when the wireless communication is not performed even after a predetermined timeout period has elapsed, and wherein the prevention unit prevents the shift to the second state by transmitting a predetermined command to said another wireless communication device at a period shorter than the timeout period.

5. The wireless communication device according to claim 3, wherein said another wireless communication device is shifted from the first state to the second state when the wireless communication is not performed even after a predetermined timeout period has elapsed, wherein the prevention unit prevents the shift to the second state by instructing said another wireless communication device to set the predetermined period to the second period if the second period is within a range of the predetermined period that can be set in said another wireless communication device, and wherein the prevention unit prevents the shift to the second state by consecutively transmitting predetermined commands at a period shorter than the timeout period if the second period is out of the range of the predetermined period that can be set in said another wireless communication device.

6. The wireless communication device according to claim 4, wherein the predetermined command is a command that does not change the setting of said another wireless communication device.

7. The wireless communication device according to claim 1, wherein the transmission unit receives setting information indicating a setting content of said another wireless communication device from a user and transmits the control command to said another wireless communication device through the wireless communication based on the setting information.

8. The wireless communication device according to claim 1, wherein the first determination unit receives necessity information indicating whether the transmission of the control command is necessary from a user and determines whether the transmission of the control command is necessary based on the necessity information.

9. The wireless communication device according to claim 1, wherein the second determination unit determines that the transmission of the control command is completed when the second determination unit receives an instruction to end the transmission of the control command from a user.

10. The wireless communication device according to claim 1, wherein the transmission unit receives setting information indicating a setting content of said another wireless communication device from a user and transmits the control command to said another wireless communication device through the wireless communication based on the setting information, and wherein the second determination unit determines that the transmission of the control command is completed when a period within which the wireless communication device does not receive the setting information from the user reaches a predetermined period.

11. A method for controlling a wireless communication device, the method comprising:

transmitting a control command, through a wireless communication, to another wireless communication device having a first state in which the wireless communication is possible and a second state in which the wireless communication is not performed, the control command being related to setting of said another wireless communication device;

determining, in a first determining, whether transmission of the control command is necessary; and preventing shift of said another wireless communication device to the second state if it is determined in the first determining that transmission of the control command is necessary; and determining, in a second determining, whether the transmission of the control command by the transmitting is completed; and cancelling the prevention by the preventing if the second determining determines that the transmission of the control command is completed.

12. A computer-readable non-transitory storage medium storing a program for causing a wireless communication device to perform:

transmitting a control command, through a wireless communication, to another wireless communication device having a first state in which the wireless communication is possible and a second state in which the wireless communication is not performed, the control command being related to setting of said another wireless communication device;

determining, in a first determining, whether transmission of the control command is necessary; and preventing shift of said another wireless communication device to the second state if it is determined in the first determining that transmission of the control command is necessary; and determining, in a second determining, whether the transmission of the control command by the transmitting is completed; and cancelling the prevention by the preventing if the second determining determines that the transmission of the control command is completed.

\* \* \* \* \*